(12) United States Patent
Fujiwaka (10) Patent No.: US 12,075,271 B2
(45) Date of Patent: Aug. 27, 2024

(54) ESTIMATION APPARATUS, TRANSMISSION RATE ESTIMATION METHOD, AND PROGRAM

(71) Applicant: NEC Corporation, Tokyo (JP)

(72) Inventor: Masaya Fujiwaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 317 days.

(21) Appl. No.: 17/608,198

(22) PCT Filed: May 25, 2020

(86) PCT No.: PCT/JP2020/020476
§ 371 (c)(1),
(2) Date: Nov. 2, 2021

(87) PCT Pub. No.: WO2020/241546
PCT Pub. Date: Dec. 3, 2020

(65) Prior Publication Data
US 2022/0232404 A1   Jul. 21, 2022

(30) Foreign Application Priority Data

May 27, 2019 (JP) .................................. 2019-098733

(51) Int. Cl.
*H04L 43/02* (2022.01)
*H04L 43/0894* (2022.01)
*H04W 24/08* (2009.01)

(52) U.S. Cl.
CPC ......... *H04W 24/08* (2013.01); *H04L 43/0894* (2013.01)

(58) Field of Classification Search
CPC ......... H04L 43/00; H04L 43/04; H04L 43/08; H04L 43/0829; H04L 43/0894;
(Continued)

(56) References Cited

U.S. PATENT DOCUMENTS 10,355,961 B2 *   7/2019  Leitner ............... H04L 61/5007
11,683,255 B2 *   6/2023  Yoshida ............... H04L 41/069
                                                          709/224
(Continued)

FOREIGN PATENT DOCUMENTS

JP          2013-066004 A          4/2013

OTHER PUBLICATIONS

Tan et al., Saluki: a High-Performance Wi-Fi Sniffing Program, Dartmouth College, 7 pages, May 2010.*

(Continued)

*Primary Examiner* — Frank Duong (57) ABSTRACT

In order to provide an estimation apparatus that estimates a transmission rate of a radio frame missed being captured, an estimation apparatus includes an acquisition section and an estimation section. The acquisition section acquires a captured radio frame captured by a capture apparatus. The estimation section estimates, based on a feature related to the captured radio frame, a transmission rate of a non-captured radio frame that is not captured by the capture apparatus. The estimation section may calculate a capture rate by dividing a number of the captured radio frames by a total number of radio frames, the total number of the radio frames being obtained by adding the number of the captured radio frames and a number of the non-captured radio frames estimated from the captured radio frames, and estimate the transmission rate of the non-captured radio frame higher, as the capture rate is lower.

13 Claims, 9 Drawing Sheets

(58) Field of Classification Search
CPC ......... H04L 43/16; H04L 43/18; H04L 43/50; H04W 24/04; H04W 24/08
See application file for complete search history.

(56) References Cited

U.S. PATENT DOCUMENTS

| | | | |
|---|---|---|---|
| 2008/0135180 A1* | 6/2008 | Huang | B65H 35/008 156/510 |
| 2008/0185504 A9* | 8/2008 | Lewis | G01N 21/253 250/226 |
| 2008/0186866 A1* | 8/2008 | Morinaga | H04L 43/0852 370/247 |
| 2008/0298271 A1* | 12/2008 | Morinaga | H04L 43/00 370/252 |

OTHER PUBLICATIONS

Siswanto et al., Network Traffic Monitoring and Analysis using Packet Sniffer, IEEE, 4 pages, 2019.*
International Search Report for PCT Application No. PCT/JP2020/020476, mailed on Jul. 14, 2020.
Wireshark, Apr. 17, 2019, [online], Internet <URL: https://www.wireshark.org/>.
Metageek, "Eye P.A. Essential: Powerful Multi-Channel Packet Analysis", Apr. 17, 2019, [online], Internet <URL: https://www.metageek.com/products/eye-pa/>.
Shigeki Nakamura, Eiji Kamioka, "Prediction of WLAN Bandwidth Utilization Based on Packet Loss Measurements", vol. 109, No. 22, IEICE Technical Report, Apr. 30, 2009, pp. 161-166, section 3.1, Japan.
Tadashi Yasumoto, Sho Fujita, and Hiroshi Esaki, "An Approach to Placement of Mesh Access Points Considering Monitoring-based Evaluation of Link Quality", IPSJ SIG Technical Reports, vol. 2008, No. 94, Sep. 18, 2008, pp. 9-16, section 2.1.2, Japan.

* cited by examiner

ESTIMATION APPARATUS, TRANSMISSION RATE ESTIMATION METHOD, AND PROGRAM

This application is a National Stage Entry of PCT/JP2020/020476 filed on May 25, 2020, which claims priority from Japanese Patent Application 2019-098733 filed on May 27, 2019, the contents of all of which are incorporated herein by reference, in their entirety.

BACKGROUND

Technical Field

The present invention relates to an estimation apparatus, a transmission rate estimation method, and a program.

Background Art

In recent years, with the aim of productivity enhancement, safety enhancement, and the like, an information and communication technology (ICT) system utilizing a radio network has been introduced into factories and the like. For example, a server on a network monitors an operation state of a production facility via the radio network using a sensor. The server promptly detects a problem, such as a malfunction of the production facility, based on results collected from the sensor.

In addition to the above, the server on the network may recognize position information of a worker via the radio network, and analyze waiting time and wastefulness of work. Through the analysis, production efficiency can be improved.

Here, usually, an environment and a state of the radio network change over time. For example, at a location with frequent environment changes such as frequent layout changes as in factories, information may be collected from the sensor via the radio network. At a location where a radio wave state in a radio section significantly changes or the like, constructing a stable radio network is not easy, and prompt analysis of the cause in case of occurrence of a radio communication failure is required.

As a technique of identifying the cause of a radio failure, there is a method of capturing transmitted and received radio frames and analyzing the captured data. For example, NPLs 1 and 2 describe a method of analyzing captured radio frames and displaying their protocol information and statistic information obtained therefrom.

CITATION LIST

Non Patent Literature

[NPL 1] Wireshark, Apr. 17, 2019, [online], Internet <URL: https://www.wireshark.org/>
[NPL 2] Metageek, "Eye P. A. Essential: Powerful Multi-Channel Packet Analysis", Apr. 17, 2019, [online], Internet <URL: https://www.metageek.com/products/eye-pa/>

SUMMARY

Technical Problem

As described above, there is a technique of capturing and analyzing radio frames. However, it is in some cases difficult to capture all of the communicated radio frames due to performance of a monitor device that captures the frames or the like. As a result, there may be a case in which all of the radio frames are failed to be captured, in other words, a case in which capture loss occurs.

In the techniques disclosed in NPLs 1 and 2, capture loss is not taken into consideration. Specifically, in NPLs 1 and 2, only captured radio frame information is analyzed, and thus there is a problem that analysis of the radio failure cannot be accurately performed.

For example, as an example of the radio failure, the following cases are assumable. A second communication terminal different from a first subject communication terminal increases communication traffic. The increase in the communication traffic causes deficiency of an available radio band. As a result, throughput of the first subject communication terminal deteriorates.

When the cause of the radio failure is to be identified from the captured radio frames, increase in communication traffic of the second terminal cannot be detected unless capture loss is taken into consideration. In other words, the cause of the radio failure (increase of communication traffic of the second terminal) may not be able to be identified.

The radio frame includes an identification number referred to as a sequence number. Thus, through analysis of a missing sequence number, occurrence of capture loss of a radio frame can be estimated from the captured radio frames. However, even though the analysis using the sequence numbers, at which transmission rate the radio frame missed being captured is transmitted is unknown. Thus, an analyzer cannot know how much the radio frame not being captured (capture loss) occupied the radio band.

The present invention has a main example object to provide an estimation apparatus, a transmission rate estimation method, and a program that contribute to estimation of a transmission rate of a radio frame missed being captured.

Solution to Problem

According to a first example aspect of the present invention, there is provided an estimation apparatus including: an acquisition section configured to acquire a captured radio frame captured by a capture apparatus; and an estimation section configured to estimate, based on a feature related to the captured radio frame, a transmission rate of a non-captured radio frame that is not captured by the capture apparatus.

According to a second example aspect of the present invention, there is provided a transmission rate estimation method in an estimation apparatus, the method including: acquiring a captured radio frame captured by a capture apparatus; and estimating a transmission rate of a non-captured radio frame not captured by the capture apparatus, based on a feature related to the captured radio frame.

According to a third example aspect of the present invention, there is provided a program that causes a computer mounted in an estimation apparatus to execute: processing of acquiring a captured radio frame captured by a capture apparatus; and processing of estimating a transmission rate of a non-captured radio frame not captured by the capture apparatus, based on a feature related to the captured radio frame.

Advantageous Effects of Invention

According to each example aspect of the present invention, the estimation apparatus, the transmission rate estimation method, and the program that contribute to estimation of the transmission rate of the radio frame missed being captured are provided. Note that, according to the present invention, instead of or together with the above effects, other effects may be exerted.

DESCRIPTION OF THE EXAMPLE EMBODIMENTS

First of all, an overview of an example embodiment will be described. Note that reference signs in the drawings provided in the overview are for the sake of convenience for each element as an example to promote better understanding, and description of the overview is not to impose any limitations. Note that, in the Specification and drawings, elements to which similar descriptions are applicable are denoted by the same reference signs, and overlapping descriptions may hence be omitted.

Figure 1:
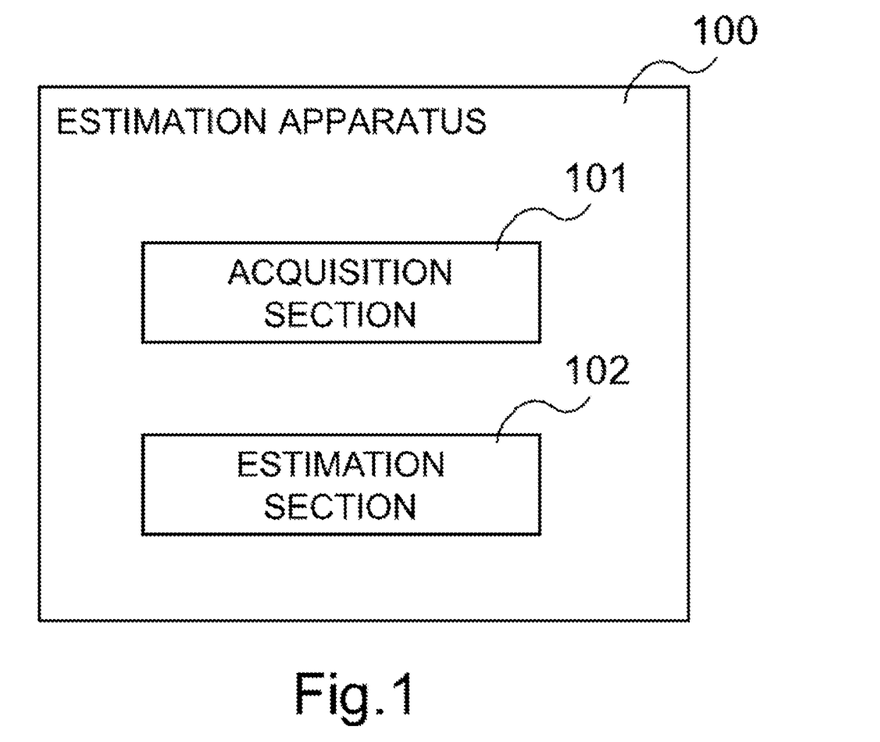
FIG. 1 is a diagram for describing an overview of an example embodiment.

An estimation apparatus 100 according to an example embodiment includes an acquisition section 101 and an estimation section 102 (see FIG. 1). The acquisition section 101 acquires a captured radio frame that is captured by a capture apparatus. The estimation section 102 estimates a transmission rate of a non-captured radio frame that is not captured by the capture apparatus, based on a feature related to the captured radio frame.

For example, the estimation apparatus 100 calculates statistical values related to the radio frame successfully captured by the capture apparatus as indicators that represent the feature related to the captured radio frame. For example, the estimation apparatus 100 calculates a capture rate of the radio frame in a predetermined period, a ratio (retransmission ratio) between an initial transmission frame and a retransmission frame, an average value of the transmission rate of the captured radio frame, and the like. These statistical values are feature amounts that feature radio communication including the radio frame successfully captured and the radio frame missed being captured by the capture apparatus. The estimation apparatus 100 estimates the transmission rate of the non-captured radio frame, based on a relational expression between the feature amounts (statistical values) and the transmission rate of the non-captured radio frame. Through definition of the relational expression using experimental data acquired in an actual environment and the like, the estimation apparatus 100 can accurately estimate the transmission rate of the non-captured radio frame.

With the use of the estimation apparatus 100 according to the disclosure of the present application, the transmission rate of the radio frame not being captured (capture loss) can be accurately estimated, and an occupancy rate of a radio band occupied by the non-captured radio frame can be accurately calculated. Consequently, this enables identification of the cause of a radio failure, such as deficiency of an available radio band, due to increase in communication traffic of other terminals.

Specific example embodiments will be described below in further detail with reference to the drawings.

First Example Embodiment

The first example embodiment will be described in further detail with reference to the drawings.

Figure 2:
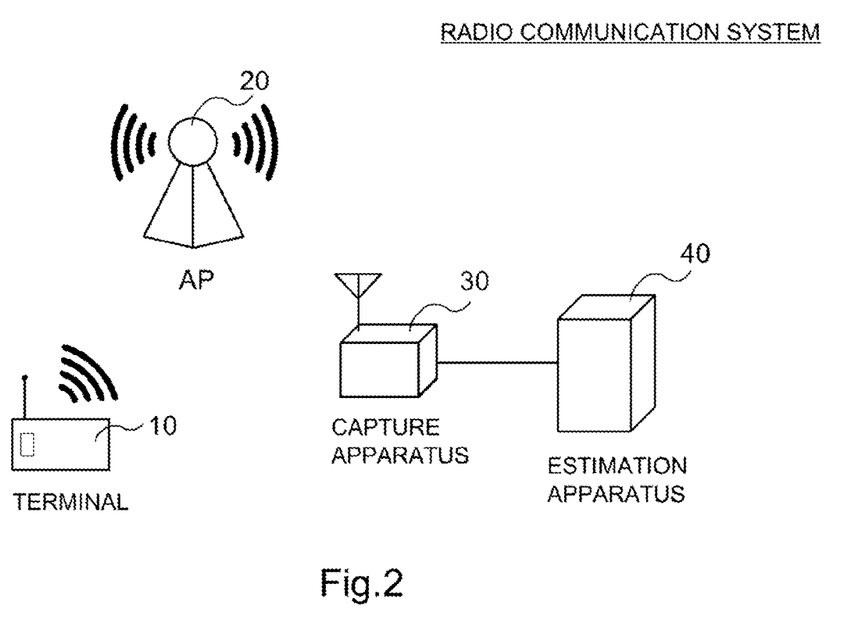
FIG. 2 is a diagram illustrating an example of a schematic configuration of a radio communication system according to a first example embodiment.

FIG. 2 is a diagram illustrating an example of a schematic configuration of a radio communication system according to the first example embodiment. With reference to FIG. 2, the radio communication system includes a terminal 10, an access point (AP) 20, a capture apparatus 30, and an estimation apparatus 40.

The configuration of the radio communication system illustrated in FIG. 2 is an example, and is not to limit the number of terminals 10 or the like. For example, it is only necessary that at least one or more terminals 10 be included in the radio communication system. In FIG. 2, the capture apparatus 30 and the estimation apparatus 40 are connected directly; however, these apparatuses may be connected via a network. Alternatively, the capture apparatus 30 may be installed in a field including the terminal 10 and the access point 20, and the estimation apparatus 40 may be installed as a cloud server.

The access point 20 provides radio connection, such as a wireless local area network (LAN), for the terminal 10.

The capture apparatus 30 is an apparatus (monitor terminal) that captures a radio frame transmitted and received between the terminal 10 and the access point 20.

In the following description, of the radio frames transmitted and received between the terminal 10 and the access point 20, the radio frame that is successfully captured by the capture apparatus 30 is referred to as a "captured radio frame". Of the radio frames transmitted and received between the terminal 10 and the access point 20, the radio frame missed being captured by the capture apparatus 30 (radio frame not being captured (capture loss)) is referred to as a "non-captured radio frame".

In the disclosure of the present application, a data frame, a management frame, and a control frame are collectively referred to as a radio frame except that those are specifically distinguished from each other.

The estimation apparatus 40 is an apparatus that estimates the transmission rate of the non-captured radio frame. Specifically, the estimation apparatus 40 estimates the transmission rate of the non-captured radio frame, based on the radio frame captured by the capture apparatus 30.

Figure 3:
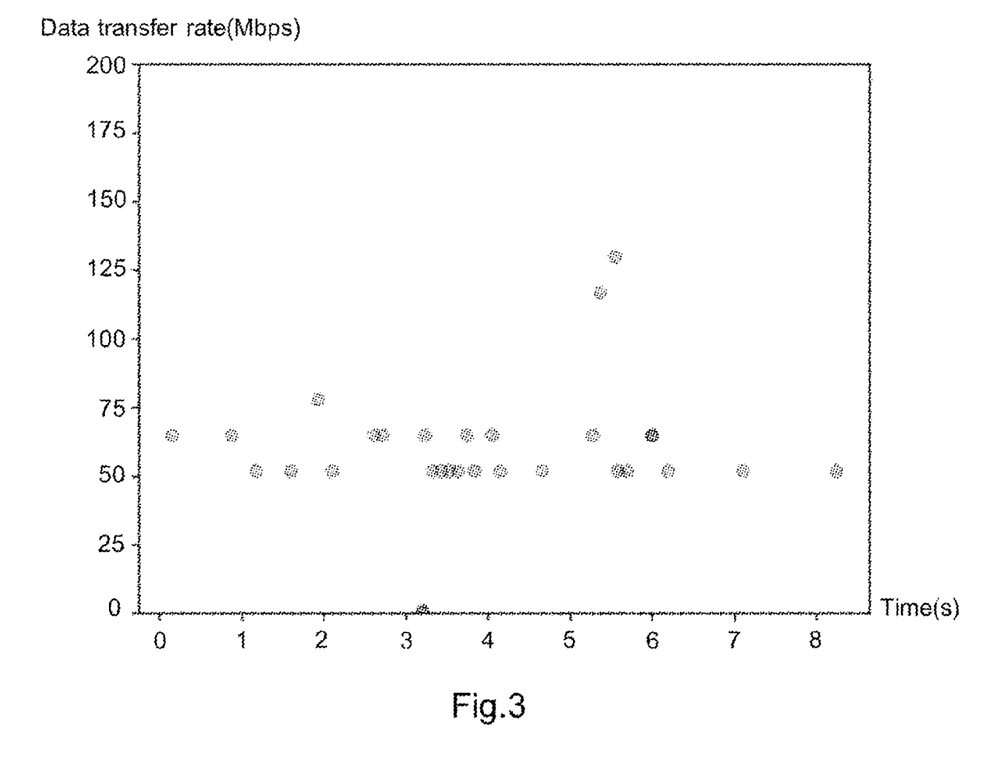
FIG. 3 is a diagram illustrating a transmission rate of radio frames having substantially the same received signal strength indication (RSSI) in the radio frames when specific radio communication is captured by a capture apparatus.

FIG. 3 is a diagram illustrating the transmission rate of the radio frames having substantially the same RSSI in the radio frames (captured radio frames) when specific radio communication is captured by the capture apparatus 30.

As a result of calculation, the average transmission rate of the captured radio frame illustrated in FIG. 3 is 58.57 Mbps (mega bit per second). The capture rate of data illustrated in FIG. 3 is 0.83 (83%), and the retransmission ratio is 3.64. In this manner, the capture rate of data illustrated in FIG. 3 is low, and the ratio of the retransmission frame is high. Note that a calculation method of the capture rate and the retransmission ratio will be described later.

The estimation apparatus 40 according to the first example embodiment estimates the transmission rate of the non-captured radio frame. In the example of FIG. 3, the estimation apparatus 40 estimates the transmission rate related to the radio frame of missed being captured by the capture apparatus 30, the radio frame being 17% of the radio frames transmitted and received between the terminal 10 and the access point 20.

Note that the data as illustrated in FIG. 3 can be obtained by fixing a positional relationship between the terminal 10, the access point 20, and the capture apparatus 30 and causing the capture apparatus 30 to operate for a predetermined period. The data illustrated in FIG. 3 can be generated from the radio frame successfully captured by the capture apparatus 30 during the predetermined period.

Figure 4:
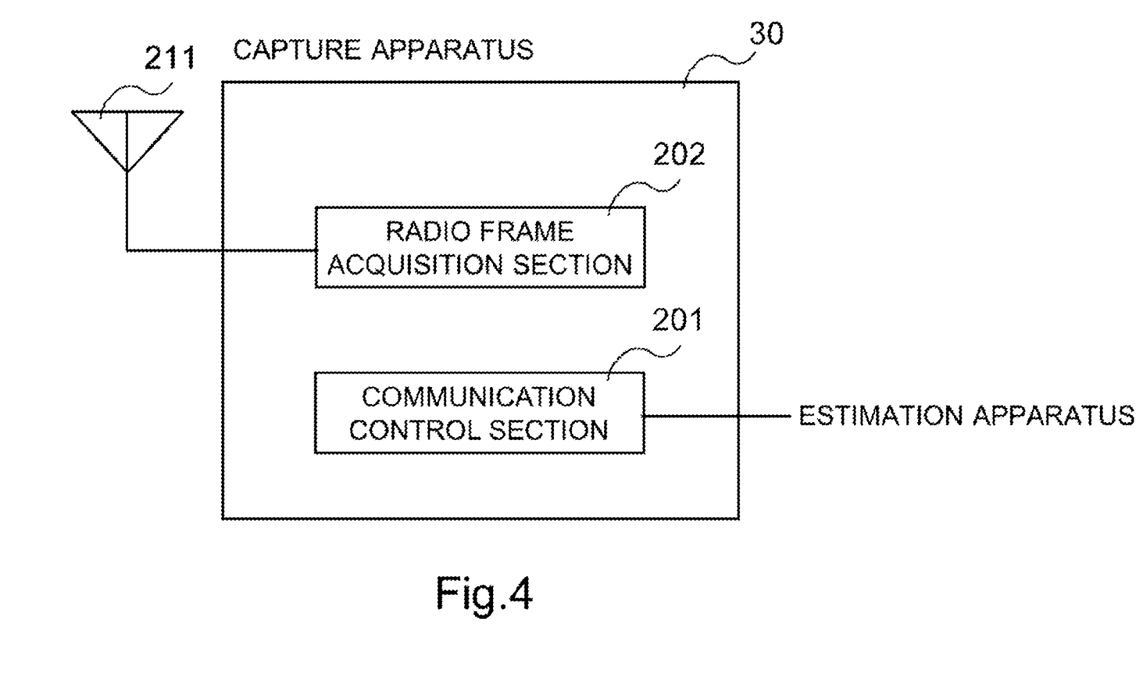
FIG. 4 is a diagram illustrating an example of a processing configuration of the capture apparatus according to the first example embodiment.

FIG. 4 is a diagram illustrating an example of a processing configuration (processing module) of the capture apparatus 30 according to the first example embodiment. With reference to FIG. 4, the capture apparatus 30 includes a communication control section 201 and a radio frame acquisition section 202.

The communication control section 201 controls communication with another apparatus (estimation apparatus 40).

The radio frame acquisition section 202 is connected to an antenna 211, and captures a radio frame. The radio frame acquisition section 202 captures (acquires) the radio frame transmitted and received between the terminal 10 and the access point 20 either periodically or at predetermined timing.

The radio frame acquisition section 202 transmits the acquired radio frame (captured radio frame) to the estimation apparatus 40. The radio frame acquisition section 202 may transmit the acquired radio frame to the estimation apparatus 40 every time the radio frame acquisition section 202 acquires the radio frame, or may collectively transmit a predetermined amount of radio frames to the estimation apparatus 40.

Figure 5:
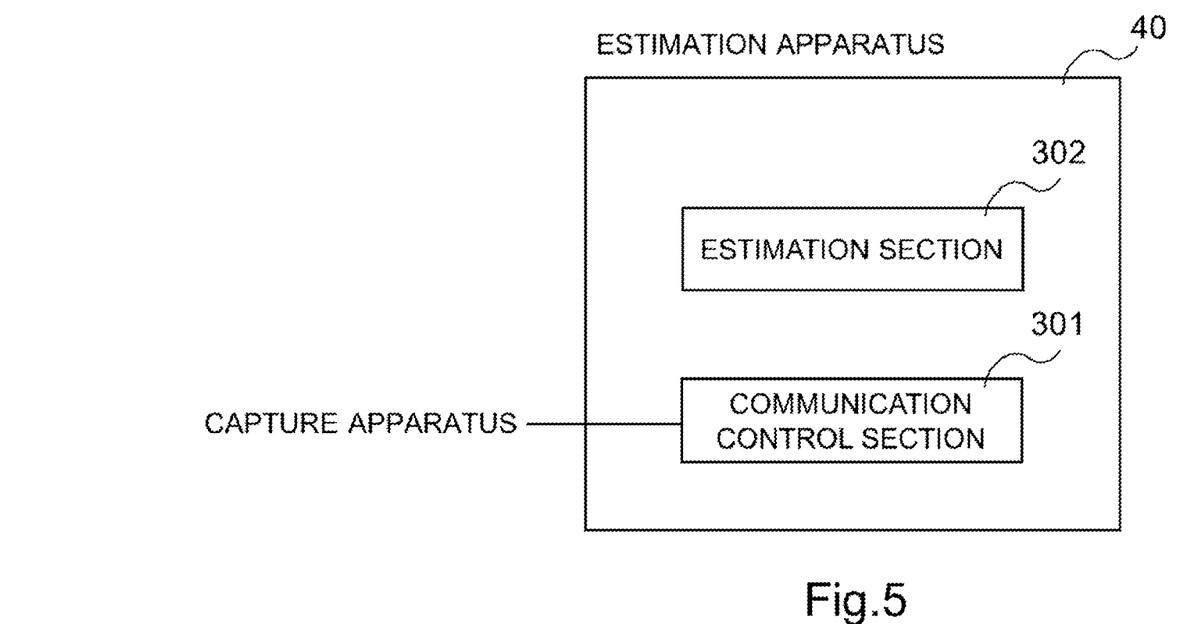
FIG. 5 is a diagram illustrating an example of a processing configuration of an estimation apparatus according to the first example embodiment.

FIG. 5 is a diagram illustrating an example of a processing configuration (processing module) of the estimation apparatus 40 according to the first example embodiment. With reference to FIG. 5, the estimation apparatus 40 includes a communication control section 301 and an estimation section 302.

The communication control section 301 controls communication with another apparatus (capture apparatus 30). The communication control section 301 includes a function as an acquisition section that acquires the captured radio frame captured by the capture apparatus 30.

The estimation section 302 calculates the statistical values related to the captured radio frame, and estimates the transmission rate of the non-captured radio frame that is not captured by the capture apparatus 30 by using the calculated statistical values. In other words, the estimation section 302 estimates the transmission rate of the non-captured radio frame, based on the captured radio frame received from the capture apparatus 30.

Specifically, the estimation section 302 executes the following processing.

The estimation section 302 checks sequence numbers of the captured radio frames, and detects a missing sequence number.

Here, the sequence numbers are consecutive numbers arranged in order of transmission. Thus, the fact that there is a missing sequence number in the captured radio frames indicates that a radio frame corresponding to the missing sequence number is a radio frame that is transmitted from the terminal 10 but is not captured by the capture apparatus 30.

Usually, as the transmission rate of the radio frame is higher, it is more likely that the capture loss occurs. As the radio wave strength (received signal strength indication (RSSI)) in a case of receiving the radio frame in the capture apparatus 30 is lower, it is more likely that the capture loss occurs.

In addition, as a result of keen study conducted by the inventors, it is proved that, when the number of retransmission frames is larger than that of initial transmission frames (non-retransmission frames) among the captured radio frames, the transmission rate of the non-captured radio frame is reduced. The reason is considered because, under an environment in which retransmission of the radio frame occurs often, the communication terminal often reduces the transmission rate in order to make communication successful.

In the disclosure of the present application, the number of retransmission frames with respect to the number of initial transmission frames is referred to as a "retransmission ratio".

As a result of study conducted by the inventors, it is found that the transmission rate of the non-captured radio frame has a tendency of approaching the average value of the transmission rate of the captured radio frame. In particular, it is found that, when the capture rate is high, the transmission rate of the non-captured radio frame is close to the transmission rate of the captured radio frame.

The estimation section 302 calculates the capture rate of the radio frame for each RSSI in a predetermined period. Specifically, the estimation section 302 estimates the number of non-captured radio frames from the radio frames captured in the predetermined period. For example, the estimation section 302 counts the number of missing numbers in a range between a minimum value and a maximum value of serial numbers in the captured radio frames acquired in the predetermined period. The number of missing numbers of the serial numbers corresponds to the number of non-captured radio frames.

The estimation section 302 calculates the sum of the number of captured radio frames acquired in the predetermined period and the number of non-captured radio frames (the number of missing numbers of the serial numbers) as a "total number of radio frames". The estimation section 302 calculates the capture rate by dividing the number of radio frames successfully captured in the predetermined period by the total number of radio frames.

According to the calculation method of the capture rate, when there is no capture loss, the capture rate is 100%.

The estimation section 302 calculates the retransmission ratio for each RSSI in the predetermined period. The estimation section 302 classifies the captured radio frames into "initial transmission frames" and "retransmission frames". Note that, determination as to whether a radio frame is that of initial transmission or retransmission can be performed by checking a retry field of a media access control (MAC) header.

The estimation section 302 counts the number of initial transmission frames and the number of retransmission frames. The estimation section 302 calculates the "retransmission ratio" by dividing the number of retransmission frames by the number of initial transmission frames.

The estimation section 302 calculates the average value of the transmission rate of the captured radio frame. Specifically, the estimation section 302 calculates the transmission rate, based on a total value of the sizes of the radio frames acquired per unit time (for example, 1 second). The estimation section 302 calculates the average value of the transmission rate by dividing the total value of the calculated transmission rate by the number of calculated transmission rates.

The estimation section 302 estimates the transmission rate of the non-captured radio frame for each RSSI by using the calculated three statistical values (the capture rate, the retransmission ratio, and the average value of the transmission rate of the captured radio frame). Specifically, the estimation section 302 estimates a transmission rate $r_{loss}$ of the non-captured radio frame, using following expression (1).

[Math. 1]

$$r_{loss} = m(c) \cdot (r_{min} + (r_{max} - r_{min}) \cdot f(c,e)) + (1 - m(c)) \cdot r_{ave} \quad (1)$$

c represents the capture rate, and e represents the retransmission ratio. $r_{ave}$ represents the average value of the transmission rate of the captured radio frame.

m(c) in expression (1) is a function for evaluating how close the transmission rate $r_{loss}$ of the non-captured radio frame is to the transmission rate average value $r_{ave}$ of the captured radio frame. m(c) is a function as follows: as the capture rate is higher, its output value is closer to "0", and as the capture rate is lower, its output value is closer to "1". In other words, as the capture rate is higher, the transmission rate $r_{ave}$ of the non-captured radio frame is closer to the transmission rate average value $r_{ave}$ of the captured radio frame. In this manner, the estimation section 302 estimates the transmission rate of the non-captured radio frame such that the transmission rate of the non-captured radio frame approaches the average value $r_{ave}$ of the transmission rate of the captured radio frame as the capture rate is higher.

$r_{max}$ of expression (1) is a value predetermined for each RSSI, and represents a maximum value of the transmission rate of the non-captured radio frame. $r_{min}$ is a value predetermined for each RSSI, and represents a minimum value of the transmission rate of the non-captured radio frame. These values are calculated in advance using past data and experiments, and are stored in a storage of the estimation apparatus 40 or the like.

Figure 6:
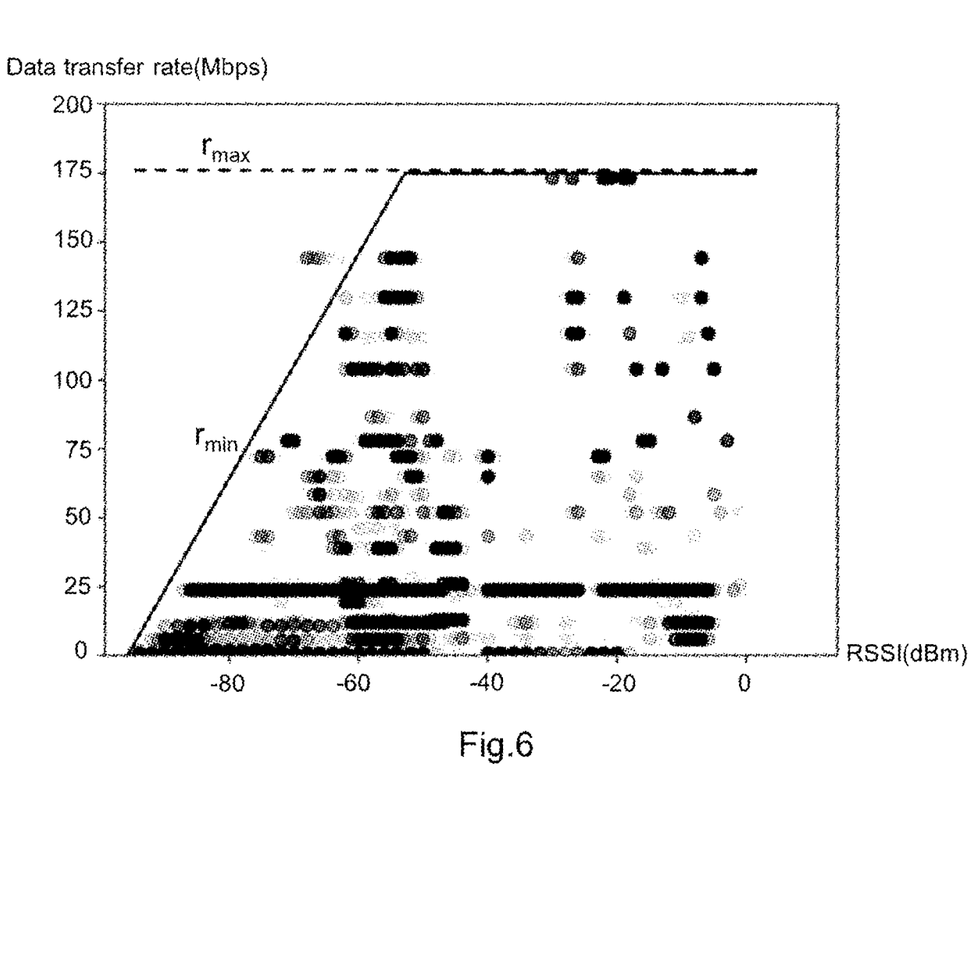
FIG. 6 is a diagram illustrating a relationship between the RSSI of captured radio frames and a transmission rate.

FIG. 6 is a diagram illustrating a relationship between the RSSI of the captured radio frames and the transmission rate. With reference to FIG. 6, it can be understood that capturing the radio frames having a higher transmission rate is more difficult as the radio wave strength is lower.

For example, in FIG. 6, the maximum value $r_{max}$ of the transmission rate of the non-captured radio frame in each RSSI (RSSI in a range from −80 to 0 dBm) is set to 175 Mbps. In other words, the maximum value of the transmission rate calculated from the captured radio frame is set to $r_{max}$.

The minimum value $r_{min}$ of the transmission rate of the non-captured radio frame can be determined using a regression line that is calculated from the maximum value of the transmission rate of the captured radio frame for each RSSI. For example, in order to calculate the inclined straight line illustrated in FIG. 6, regression analysis related to the maximum value of the transmission rate of the captured radio frame for each RSSI is executed.

When each RSSI is input to the function obtained through the regression analysis, lmin for each RSSI is calculated. For example, when the obtained function is a linear function, approximately 50 Mbps is calculated as $r_{min}$ corresponding to the RSSI of −80 dBm, and approximately 125 Mbps is calculated as $r_{min}$ corresponding to the RSSI of −60 dBm.

In this manner, the minimum value $r_{min}$ and the maximum value $r_{max}$ of possible values of the transmission rate of the non-captured radio frame are prepared in advance. In particular, the minimum value $r_{min}$ of the transmission rate of the non-captured radio frame is calculated based on the maximum value (maximum value for each RSSI) of the transmission rate of the captured radio frame acquired in the past.

Note that a sufficient number of pieces of data may not have been acquired depending on the timing of executing the regression analysis. If the regression analysis is executed for such pieces of data, a wrong function may be derived. In order to avoid such inconvenience, any one of the following three countermeasures may be selected and executed.

As a first countermeasure, the regression analysis is not performed until sufficient data is acquired.

As a second countermeasure, when the maximum value of the transmission rate of first RSSI is smaller than the maximum value of the transmission rate of second RSSI which has a value smaller than that of the first RSSI, the maximum value of the transmission rate of the second RSSI whose maximum value of the transmission rate is small is not used for the regression analysis.

As a third countermeasure, when the maximum value of the transmission rate of first RSSI is smaller than the maximum value of the transmission rate of second RSSI which has a value smaller than that of the first RSSI and is smaller than the maximum value of the transmission rate of third RSSI which has a value larger than that of the first RSSI, and when the maximum value of the transmission rate of the third RSSI is larger than the maximum value of the transmission rate of the second RSSI, the transmission rate is modified. Specifically, when the above condition is satisfied, the maximum value of the transmission rate of the first RSSI is modified so as to be a value between the maximum value of the transmission rate of the second RSSI and the maximum value of the transmission rate of the third RSSI.

The first to third countermeasures are based on the premise that, as the RSSI is higher, the maximum value of the transmission rate that can be captured is larger, and otherwise, sufficient data is not acquired.

Note that, in FIG. 6, the maximum value $r_{max}$ of the transmission rate of the non-captured radio frame is set to the maximum transmission rate of all of the radio frames that are successfully captured in the past. However, the maximum value $r_{max}$ may be a maximum transmission rate value according to a radio standard.

The evaluation function m(c) described above can be, for example, a function expressed in following expression (2).

[Math. 2]
$$m(c) = 1 - \frac{1}{1 + \exp(-\epsilon \cdot c - \theta)} \quad (2)$$

f(c, e) in expression (1) is an evaluation function for evaluating the capture rate and the retransmission ratio. f(c, e) is designed such that, as the capture rate is lower, its output value is larger, and as the retransmission ratio is smaller, its output value is larger. A possible value of the output value of the evaluation function f(c, e) ranges from 0 to 1.

The evaluation function f(c, e) can be, for example, a function as shown in following expression (3).

[Math. 3]
$$f(c, e) = 1 - \frac{0.5}{1 + \exp(-\beta \cdot c - \gamma)} - \frac{0.5}{1 + \exp(-\delta \cdot e - \varepsilon)} \quad (3)$$

Parameters $\epsilon$ and $\theta$ of the evaluation function m(c) described in expression (2) and parameters $\beta$, $\gamma$, $\delta$, and $\varepsilon$ of the value function f(c, e) described in expression (3) are calculated in advance through an experiment or the like. Specifically, with a capture apparatus for an experiment being disposed near the terminal 10 or the like, the capture apparatus for an experiment captures transmitted and received radio frames. In this manner, the transmission rate of the non-captured radio frame not captured by the capture apparatus 30 can be calculated for each RSSI, thus enabling calculation of the transmission rate of the non-captured radio frame to be reference. In other words, an actual measurement value related to the transmission rate of the non-captured radio frame is calculated through an experiment or the like. The parameters of the evaluation functions m(c) and f(c, e) are calculated and selected such that an estimation value estimated according to expression (1) matches the actual measurement value.

Regarding the relationship between the evaluation functions m(c) and f(c, e), as the output value of m(c) is closer to "1" (the capture rate is closer to 0), the transmission rate $r_{loss}$ of the non-captured radio frame approaches a value of following expression (4).

[Math. 4]
$$(r_{min} + (r_{max} - r_{min}) \cdot f(c,e)) \quad (4)$$

The value of expression (4) is a value falling within a range from $r_{min}$ to $r_{max}$. Expression (4) indicates that, as the capture rate is lower and the retransmission ratio is lower, the value further is closer to the maximum value $r_{max}$ of the transmission rate of the non-captured radio frame. In other words, when the transmission rate of the non-captured radio frame is estimated according to expression (1), as the capture rate is lower, the transmission rate of the non-captured radio frame is estimated higher. In a similar manner, as the retransmission ratio is lower, the transmission rate of the non-captured radio frame is estimated higher. In other words, the transmission rate of the non-captured radio frame is estimated such that the transmission rate of the non-captured radio frame is equal to or higher than the minimum value $r_{min}$ of the transmission rate of the non-captured radio frame (is more apart from the minimum value $r_{min}$) as the capture rate is lower.

In contrast, expression (4) indicates that, as the capture rate is higher and the retransmission ratio is higher, the value is closer to the minimum value $r_{min}$ of the transmission rate of the non-captured radio frame.

Figure 7:
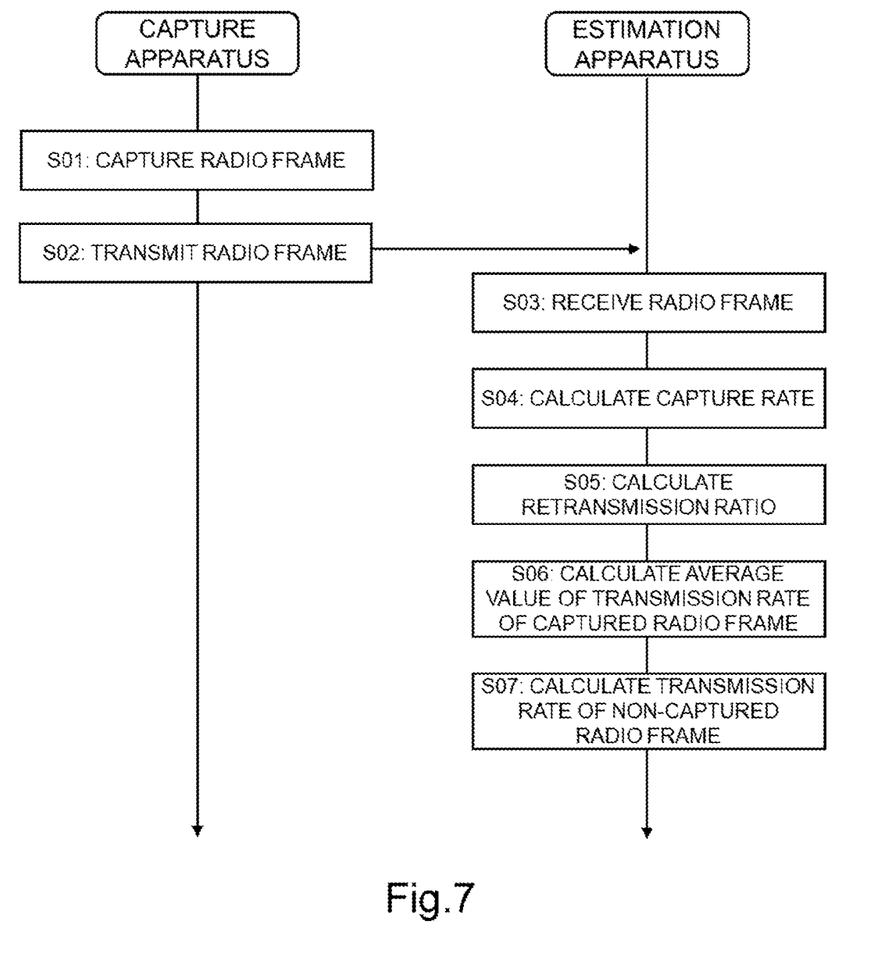
FIG. 7 is a sequence diagram illustrating an example of operation of the radio communication system according to the first example embodiment.

Nest, operation of the radio communication system (transmission rate estimation system) according to the first example embodiment will be described. FIG. 7 is a sequence diagram illustrating an example of operation of the radio communication system according to the first example embodiment.

The capture apparatus 30 captures wirelessly communicated radio frames by using the radio frame acquisition section 202 (Step S01).

Next, the capture apparatus 30 transmits the captured radio frames (captured radio frames) to the estimation apparatus 40 (Step S02). The transmission of the captured radio frames may be performed in real time, or the transmission may be collectively performed periodically or when measurement ends.

The estimation apparatus 40 receives the captured radio frames from the capture apparatus 30 (Step S03).

The estimation apparatus 40 estimates occurrence of capture loss of a radio frame from the received captured radio frames, and calculates the capture rate for each certain period (Step S04).

The estimation apparatus 40 calculates the retransmission ratio indicating the ratio of the retransmission frames with respect to the non-retransmission frames from the received captured radio frames (Step S05).

The estimation apparatus 40 calculates the average value of the transmission rate of the captured radio frame for each certain period from the received captured radio frames (Step S06).

The estimation apparatus 40 calculates the transmission rate of the non-captured radio frame for each certain period, using expression (1) described above (Step S07). Specifically, the estimation apparatus 40 calculates the RSSI of the radio frames in each period, and estimates the transmission rate of the radio frames not being captured (capture loss) in the period for each RSSI, using the transmission rate estimation expression. In other words, the estimation apparatus 40 calculates the statistical values (the capture rate, the retransmission ratio, and the average value of the transmission rate) related to the captured radio frames for each RSSI, and estimates the transmission rate of the non-captured radio frame for each RSSI.

Figure 8:
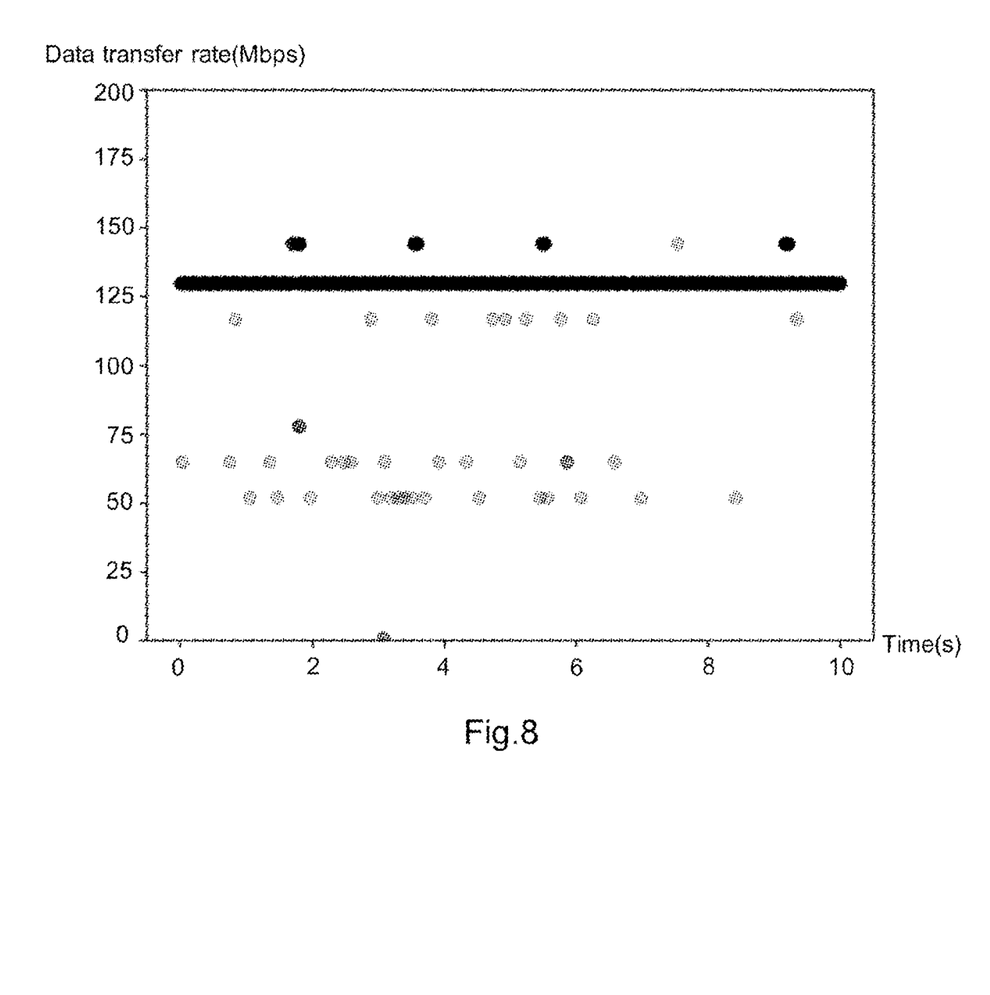
FIG. 8 is a diagram in which the transmission rates including non-captured radio frames are plotted in the radio frames of radio communication the same as that of FIG. 3.

FIG. 8 is a diagram in which the transmission rates including the non-captured radio frames are plotted in the radio frames of radio communication the same as that of FIG. 3. With reference to FIG. 3 and FIG. 8, it can be understood that the capture apparatus 30 fails to capture most of the radio frames whose transmission rate exceeds a predetermined value (in the example of FIG. 3, 100 Mbps). In FIG. 8, the average value of the transmission rate of the non-captured radio frame is 130.2 Mbps.

Note that the data as illustrated in FIG. 8 can be, for example, created based on the radio frames (captured radio frames+non-captured radio frames) acquired by the access point 20 and the captured radio frames acquired by the capture apparatus 30. More specifically, the non-captured radio frames are extracted by eliminating the radio frames acquired by the capture apparatus 30 from the radio frames acquired by the access point 20. With the use of the extracted non-captured radio frames, the transmission rate of the non-captured radio frame is calculated.

The result of estimation of the transmission rate of the non-captured radio frame by using the transmission rate estimation expression according to the disclosure of the present application for the data illustrated in FIG. 3 is 132.1 Mbps. As compared to the actual measurement value (130.2 Mbps) calculated from FIG. 8 above, it can be understood that the estimation apparatus 40 according to the disclosure of the present application has accurately estimated the transmission rate of the non-captured radio frame.

Figure 9:
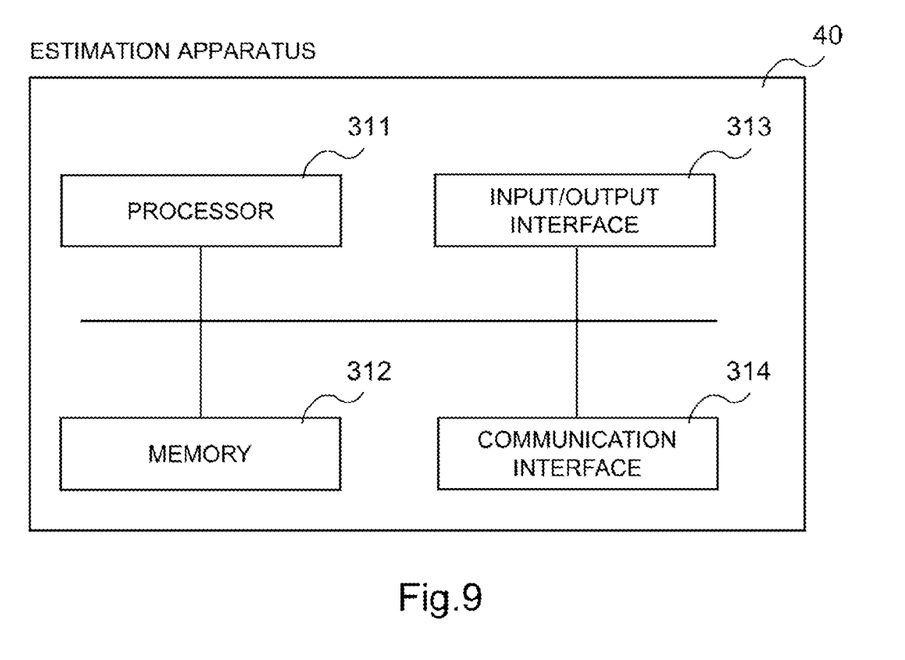
FIG. 9 is a diagram illustrating an example of a hardware configuration of the estimation apparatus.

Next, hardware of each apparatus constituting the radio communication system will be described. FIG. 9 is a diagram illustrating an example of a hardware configuration of the estimation apparatus 40.

The estimation apparatus 40 can be configured with an information processing apparatus (so-called, a computer), and includes a configuration illustrated in FIG. 9. For example, the estimation apparatus 40 includes a processor 311, a memory 312, an input/output interface 313, a communication interface 314, and the like. Constituent elements such as the processor 311 are connected to each other with an internal bus or the like, and are configured to be capable of communicating with each other.

Note that the hardware configuration of the estimation apparatus 40 is not limited to the configuration illustrated in FIG. 9. The estimation apparatus 40 may include hardware not illustrated, or need not include the input/output interface 313 as necessary. The number of processors 311 and the like included in the estimation apparatus 40 is not to be limited to the example illustrated in FIG. 9, and for example, a plurality of processors 311 may be included in the estimation apparatus 40.

The processor 311 is, for example, a programmable device such as a central processing unit (CPU), a micro processing unit (MPU), and a digital signal processor (DSP). Alternatively, the processor 311 may be a device such as a field programmable gate array (FPGA) and an application specific integrated circuit (ASIC). The processor 311 executes various programs including an operating system (OS).

The memory 312 is a random access memory (RAM), a read only memory (ROM), a hard disk drive (HDD), a solid state drive (SSD), or the like. The memory 312 stores an OS program, an application program, and various pieces of data.

The input/output interface 313 is an interface of a display apparatus and an input apparatus (not illustrated). The display apparatus is, for example, a liquid crystal display or the like. The input apparatus is, for example, an apparatus that receives user operation, such as a keyboard and a mouse.

The communication interface 314 is a circuit, a module, or the like that performs communication with another apparatus. For example, the communication interface 314 includes a network interface card (NIC) or the like.

The function of the estimation apparatus 40 is implemented by various processing modules. Each of the processing modules is, for example, implemented by the processor 311 executing a program stored in the memory 312. The program can be recorded on a computer readable storage medium. The storage medium can be a non-transitory storage medium, such as a semiconductor memory, a hard disk, a magnetic recording medium, and an optical recording medium. In other words, the present invention can also be implemented as a computer program product. The program can be updated through downloading via a network, or by using a storage medium storing a program. In addition, the processing module may be implemented by a semiconductor chip.

Note that hardware configurations of the terminal 10, the access point 20, and the capture apparatus 30 are obvious to those of ordinary skill in the art, and detailed description thereof will thus be omitted.

As described above, the estimation apparatus 40 according to the first example embodiment estimates the transmission rate of the non-captured radio frame by using the capture rate, the retransmission ratio, and the transmission rate average value of the captured radio frame. The estimation apparatus 40 can estimate the transmission rate of the radio frame that is not captured (capture loss) in the capture apparatus 30 by using the at least one or more pieces of information out of the three statistical values.

By accurately estimating the transmission rate of the non-captured radio frame, how much the radio band is used can be accurately estimated, thus enabling determination as to whether an available radio band is insufficient. In addition, the whole transmission rate of wirelessly communicated radio frames can be known, thus enabling the use for analysis of communication quality.

Example Alterations

The configuration, the operation, and the like of the radio communication system described in the example embodiment are merely examples, and are not to limit the configuration and the like of the system.

For example, the functions of the capture apparatus 30 and the estimation apparatus 40 may be implemented by one apparatus. More specifically, the function of the estimation apparatus 40 may be provided in the capture apparatus 30.

In the example embodiment, the transmission rate of the non-captured radio frame is estimated using three statistical values (the capture rate, the retransmission ratio, and the average value of the transmission rate). However, the estimation apparatus 40 can also estimate the transmission rate of the non-captured radio frame by using a part of the three statistical values. For example, the estimation apparatus 40 may estimate the transmission rate, with any one of the statistical values being set to a fixed value, and values calculated from the captured radio frame being used for the other two statistical values. In this case, it is assumed that estimation accuracy is deteriorated as compared to a case of using three statistical values. However, because the estimation value can be obtained with a smaller calculation amount related to calculation of the transmission rate of the non-captured radio frame, the calculation method (estimation of the transmission rate using a part of the statistical values) is appropriate for a case in which a rough value of the transmission rate is required, a case in which the estimation value is calculated in real time, and the like.

The example embodiment describes calculation of the minimum value $r_{min}$ of the transmission rate of the non-captured radio frame using experimental data; however, the estimation apparatus 40 may calculate the minimum value. Specifically, the estimation apparatus 40 calculates a theoretical lowest transmission rate by using time information at the time of capturing of the radio frame successfully captured before and after the non-captured radio frame.

Here, two times of the captured radio frame (transmission time or reception time of the radio frame) are defined as t1 and t2 (second). The size of the radio frame not captured between the two times is defined as k bytes. In this case, the theoretical lowest transmission rate is calculated using following expression (5).

[Math. 5]

$$\frac{k*(s+\alpha)*8}{(t2-t1)}(bps) \quad (5)$$

s is the size of the non-captured radio frame, and is estimated from the size of the preceding and following captured radio frames. α is waiting time such as DCF Inter Frame Space (DIFS) and back-off time, and is added according to contents of communication.

When the lowest transmission rate calculated according to expression (5) above is higher than $r_{min}$ described in the first example embodiment, the estimation apparatus 40 regards the calculated lowest transmission rate as $r_{min}$. In contrast, when the lowest transmission rate calculated according to expression (5) above is equal to or less than $r_{min}$ described in the first example embodiment, the estimation apparatus 40 uses $r_{min}$ described in the first example embodiment as it is. In this manner, the estimation apparatus 40 compares the minimum value of the theoretical transmission rate calculated from the time information of the radio frames captured before and after the non-captured radio frame and the minimum value $r_{min}$ calculated from the radio frame captured in the past. As a result of the comparison, the estimation apparatus 40 selects the larger value as the minimum value $r_{min}$ of the transmission rate of the non-captured radio frame.

In the example embodiment, three statistical values (the capture rate, the retransmission ratio, and the average value of the transmission rate of the captured radio frame) are used as indicators (evaluation values) indicating feature related to the captured radio frame. However, when there is a relationship between the transmission rate of the captured radio frame and another feature of the captured radio frame, the transmission rate of the non-captured radio frame may be estimated based on such another feature. In the example embodiment, the transmission rate of the non-captured radio frame is estimated using expression (4); however, an estimation expression calculated with another regression method using a support vector machine, boosting, a neural network, or the like may be used. Note that publicly known techniques can be used for algorithm such as the support vector machine, and description thereof will thus be omitted.

By installing a transmission rate estimation program in a storage section of a computer, the computer can be caused to function as an estimation apparatus. By causing the computer to execute the transmission rate estimation program, a transmission rate estimation method can be executed by the computer.

In the sequence diagram used in the description above, a plurality of processes (processing) are described in order; however, the order of execution of the processes executed in each example embodiment is not limited to the described order. In each example embodiment, the illustrated order of processes can be changed as far as there is no problem with regard to processing contents, such as a change in which respective processes are executed in parallel, for example.

Although the industrial applicability of the present invention is apparent from the description above, the present invention can be preferably applied to a cause analysis tool used when a radio communication failure occurs or the like.

The whole or part of the example embodiments disclosed above can be described as in the following supplementary notes, but are not limited to the following.

(Supplementary Note 1)

An estimation apparatus (40, 100) including:
an acquisition section (101, 301) configured to acquire a captured radio frame captured by a capture apparatus (30); and
an estimation section (102, 302) configured to estimate, based on a feature related to the captured radio frame, a transmission rate of a non-captured radio frame that is not captured by the capture apparatus (30).

(Supplementary Note 2)

The estimation apparatus (40, 100) according to supplementary note 1, wherein
the estimation section (102, 302) is configured to
calculate a capture rate by dividing a number of the captured radio frames by a total number of radio frames, the total number of the radio frames being obtained by adding the number of the captured radio frames and a number of the non-captured radio frames estimated from the captured radio frames, and
estimate the transmission rate of the non-captured radio frame higher, as the capture rate is lower.

(Supplementary Note 3)

The estimation apparatus (40, 100) according to supplementary note 2, wherein
the estimation section (102, 302) is configured to
count a number of retransmission frames and a number of initial transmission frames of the radio frames in a predetermined period, and calculate a retransmission ratio by dividing the number of retransmission frames by the number of initial transmission frames, and
estimate the transmission rate of the non-captured radio frame higher, as the retransmission ratio is lower.

(Supplementary Note 4)

The estimation apparatus (40, 100) according to supplementary note 3, wherein
the estimation section (102, 302) is configured to
calculate an average value of a transmission rate of the captured radio frame, and
estimate the transmission rate of the non-captured radio frame such that the transmission rate of the non-captured radio frame is closer to the average value of the transmission rate of the captured radio frame as the capture rate is higher.

(Supplementary Note 5)

The estimation apparatus (40, 100) according to any one of supplementary notes 2 to 4, wherein
the estimation section (102, 302) is configured to estimate the transmission rate of the non-captured radio frame such that the transmission rate of the non-captured radio frame is equal to or higher than a minimum value of possible values of the transmission rate of the non-captured radio frame as the capture rate is lower.

(Supplementary Note 6)

The estimation apparatus (40, 100) according to supplementary note 5, wherein
the minimum value of the transmission rate of the non-captured radio frame is calculated based on a maximum value of the transmission rate of the captured radio frame acquired in past.

(Supplementary Note 7)

The estimation apparatus (40, 100) according to supplementary note 5 or 6, wherein
the estimation section (102, 302) is configured to compare a minimum value of a theoretical transmission rate calculated from time information of the radio frames captured before and after the non-captured radio frame and the minimum value of the possible values of the transmission rate of the non-captured radio frame calculated from the radio frames captured in past, and select a larger value as the minimum value of the possible values of the transmission rate of the non-captured radio frame.

(Supplementary Note 8)

The estimation apparatus (40, 100) according to any one of supplementary notes 1 to 7, wherein
the estimation section (102, 302) is configured to calculate a statistical value related to the captured radio frame for each radio wave strength, and estimate the transmission rate of the non-captured radio frame for each radio wave strength.

(Supplementary Note 9)

The estimation apparatus (40, 100) according to any one of supplementary notes 2 to 7, wherein
the estimation section (102, 302) is configured to estimate the transmission rate of the non-captured radio frame such that the transmission rate of the non-captured radio frame is closer to a maximum value of possible values of the transmission rate of the non-captured radio frame, as the capture rate and a retransmission ratio are lower.

(Supplementary Note 10)

The estimation apparatus (40, 100) according to supplementary note 9, wherein
the maximum value of the possible values of the transmission rate of the non-captured radio frame is a maximum transmission rate in all of the radio frames successfully captured in past, or a maximum transmission rate value according to a radio standard.

(Supplementary Note 11)

A transmission rate estimation method in an estimation apparatus (40, 100), the method including:
acquiring a captured radio frame captured by a capture apparatus (30); and
estimating, in the estimation apparatus, a transmission rate of a non-captured radio frame not captured by the capture apparatus (30), based on a feature related to the captured radio frame.

(Supplementary Note 12)

A program that causes a computer (311) mounted in an estimation apparatus (40, 100) to execute:
processing of acquiring a captured radio frame captured by a capture apparatus (30); and
processing of estimating a transmission rate of a non-captured radio frame not captured by the capture apparatus (30), based on a feature related to the captured radio frame.

The configuration of supplementary note 11 and the configuration of supplementary note 12 can be developed into any one of the configurations of supplementary notes 2 to 10 in the same way as in the case of supplementary note 1.

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

This application claims priority based on JP 2019-098733 filed on May 27, 2019, the entire disclosure of which is incorporated herein.

REFERENCE SIGNS LIST

10 Terminal
20 Access Point (AP)
30 Capture Apparatus
40, 100 Estimation Apparatus
101 Acquisition Section
102, 302 Estimation Section
201, 301 Communication Control Section
202 Radio Frame Acquisition Section
211 Antenna
311 Processor
312 Memory
313 Input/Output Interface
314 Communication Interface

What is claimed is:

1. An estimation apparatus comprising:
a memory storing instructions; and
one or more processors configured to execute the instructions to:
acquire captured radio frames captured by a capture apparatus;
calculate a capture rate by dividing a number of the captured radio frames by a total number of radio frames, the total number of the radio frames being obtained by adding the number of the captured radio frames and a number of non-captured radio frames estimated from the captured radio frames; and
estimate a transmission rate of the non-captured radio frames that are not captured by the capture apparatus as higher as the capture rate is lower.

2. The estimation apparatus according to claim 1, wherein the one or more processors are further configured to calculate a statistical value related to the captured radio frames for each of a plurality of radio wave strengths, and estimate the transmission rate of the non-captured radio frames for each radio wave strength.

3. The estimation apparatus according to claim 1, wherein the one or more processors are further is configured to:
count a number of retransmission frames and a number of initial transmission frames of the total number of radio frames in a predetermined period, and calculate a retransmission ratio by dividing the number of retransmission frames by the number of initial transmission frames, and
estimate the transmission rate of the non-captured radio frame as higher as the retransmission ratio is lower.

4. The estimation apparatus according to claim 3, wherein the one or more processors are further configured to:
calculate an average value of a transmission rate of the captured radio frames, and
estimate the transmission rate of the non-captured radio frames such that the transmission rate of the non-captured radio frames is closer to the average value of the transmission rate of the captured radio frames as the capture rate is higher.

5. The estimation apparatus according to claim 1, wherein the one or more processors are further configured to estimate the transmission rate of the non-captured radio frames such that the transmission rate of the non-captured radio frames is equal to or higher than a minimum value of possible values of the transmission rate of the non-captured radio frames as the capture rate is lower.

6. The estimation apparatus according to claim 5, wherein the minimum value of the transmission rate of the non-captured radio frames is calculated based on a maximum value of a transmission rate of the captured radio frames acquired in past.

7. The estimation apparatus according to claim 5, wherein the one or more processors are further configured to compare a minimum value of a theoretical transmission rate calculated from time information of the radio frames captured before and after the non-captured radio frames and the minimum value of the possible values of the transmission rate of the non-captured radio frames calculated from the radio frames previously captured, and select a largest value as the minimum value of the possible values of the transmission rate of the non-captured radio frames.

8. The estimation apparatus according to claim 1, wherein the one or more processors are further configured to estimate the transmission rate of the non-captured radio frames such that the transmission rate of the non-captured radio frames is closer to a maximum value of possible values of the transmission rate of the non-captured radios frame, as the capture rate and a retransmission ratio are lower.

9. The estimation apparatus according to claim 8, wherein the maximum value of the possible values of the transmission rate of the non-captured radio frames is a maximum transmission rate in all of the previously captured radio frames, or a maximum transmission rate value according to a radio standard.

10. A transmission rate estimation method performed by a computer and comprising:
   acquiring captured radio frames captured by a capture apparatus;
   calculating a capture rate by dividing a number of the captured radio frames by a total number of radio frames, the total number of the radio frames being obtained by adding the number of the captured radio frames and a number of non-captured radio frames estimated from the captured radio frames; and
   estimating a transmission rate of the non-captured radio frames that are not captured by the capture apparatus as higher as the capture rate is lower.

11. The transmission rate estimation method according to claim 10, further comprising:
   estimating the transmission rate of the non-captured radio frames such that the transmission rate of the non-captured radio frames is closer to a maximum value of possible values of the transmission rate of the non-captured radios frame, as the capture rate and a retransmission ratio are lower.

12. A non-transitory computer readable recording medium storing a program that causes one or more processors to execute:
   processing of acquiring captured radio frames captured by a capture apparatus;
   processing of calculating a capture rate by dividing a number of the captured radio frames by a total number of radio frames, the total number of the radio frames being obtained by adding the number of the captured radio frames and a number of non-captured radio frames estimated from the captured radio frames; and
   processing of estimating a transmission rate of the non-captured radio frames that are not captured by the capture apparatus as higher as the capture rate is lower.

13. The non-transitory computer readable recording medium according to claim 12, wherein the program causes the one or more processors to further execute:
   processing of estimating the transmission rate of the non-captured radio frames such that the transmission rate of the non-captured radio frames is closer to a maximum value of possible values of the transmission rate of the non-captured radios frame, as the capture rate and a retransmission ratio are lower.

* * * * *